United States Patent
Ulicny et al.

[11] Patent Number: 5,975,118
[45] Date of Patent: Nov. 2, 1999

[54] ADAPTER FOR MOUNTING AN ACTUATOR TO A VALVE

[75] Inventors: Dennis J. Ulicny, Waukesha; Hugh Hudson, Wauwatosa; Michael Ulschmid, Milwaukee, all of Wis.

[73] Assignee: Johnson Controls Technology, Plymouth, Mich.

[21] Appl. No.: 08/957,758

[22] Filed: Oct. 24, 1997

[51] Int. Cl.[6] .................................................. F16K 49/00
[52] U.S. Cl. ........................................... 137/338; 251/292
[58] Field of Search ..................................... 137/334, 338; 251/292

[56] References Cited

U.S. PATENT DOCUMENTS

| | | |
|---|---|---|
| 1,679,218 | 7/1928 | Huff ......................................... 137/338 |
| 3,290,003 | 12/1966 | Kessler ...................................... 251/367 |
| 3,720,227 | 3/1973 | Curran ...................................... 137/338 |
| 4,840,348 | 6/1989 | Takigawa et al. ...................... 137/338 |
| 4,953,586 | 9/1990 | Weyer ...................................... 251/292 |
| 5,029,811 | 7/1991 | Yamamoto et al. ..................... 251/367 |

*Primary Examiner*—A. Michael Chambers
*Attorney, Agent, or Firm*—Quarles & BRady LLP

[57] ABSTRACT

An adapter for intercoupling a valve and an actuator to limit the heat transfer therebetween. The adapter includes a body for separating the actuator from the valve, first means for coupling the adapter to the valve, second means for coupling the adapter to the actuator, and a passage extending through the body to accommodate a stem for operationally coupling the actuator to the valve.

15 Claims, 3 Drawing Sheets

ADAPTER FOR MOUNTING AN ACTUATOR TO A VALVE

BACKGROUND OF THE INVENTION

1. Technical Field

The present invention relates generally to actuators for positioning a valve in a fluid distributing system and, more particularly, to an adapter positionable between an actuator and valve to limit heat transfer therebetween.

2. Discussion

In the heating, ventilation, and air condition ("HVAC") industry, valves are used to control air and fluid movements within systems. The valves are generally adjusted automatically by actuators having heat sensitive components such as electronics and gaskets. Accordingly, it is desirable to limit or prevent heat transfer to the actuator from a valve controlling the flow of hot fluids such as steam or hot water. The prior art has failed to adequately address this need.

SUMMARY OF THE INVENTION

Accordingly, a need exists for an adapter disposable between an actuator and a valve to reduce heat transfer therebetween. The present invention addresses this need by providing an adapter for intercoupling a valve and an actuator. The adapter includes a body for separating the actuator from the valve, first means for coupling the adapter to the valve, second means for coupling the adapter to the actuator, and a passage extending through the body to accommodate a stem for operationally coupling the actuator to the valve.

Among the benefits provided by the preferred embodiment of the present invention is the separation of the actuator from the valve by a distance greater than that provided by the prior art thus increasing the path the heat must travel to reach the actuator; providing a primary conduction path from the valve to the actuator that has a higher thermal resistance due to the material from which the adapter is manufactured; and providing a heat sink coupled to the adapter that cools the adapter, shields the adapter from the valve to prevent radiation of heat, and that acts as a deflector to channel hot air currents from the valve away from the actuator.

BRIEF DESCRIPTION OF THE DRAWINGS

Other objects and advantages of the invention will become apparent upon reading the following detailed description and upon reference to the drawings, in which.

DETAILED DESCRIPTION OF THE DRAWINGS

This description of the preferred embodiment of the present invention is merely exemplary in nature and is not intended to limit the scope of the invention as defined by the appended claims. Moreover, while this description depicts the invention for use with an actuator and valve, it is intended to adequately teach one skilled in the art to make and use the adapter disclosed herein in numerous environments wherein the advantages of the adapter would be useful.

Figure 1:
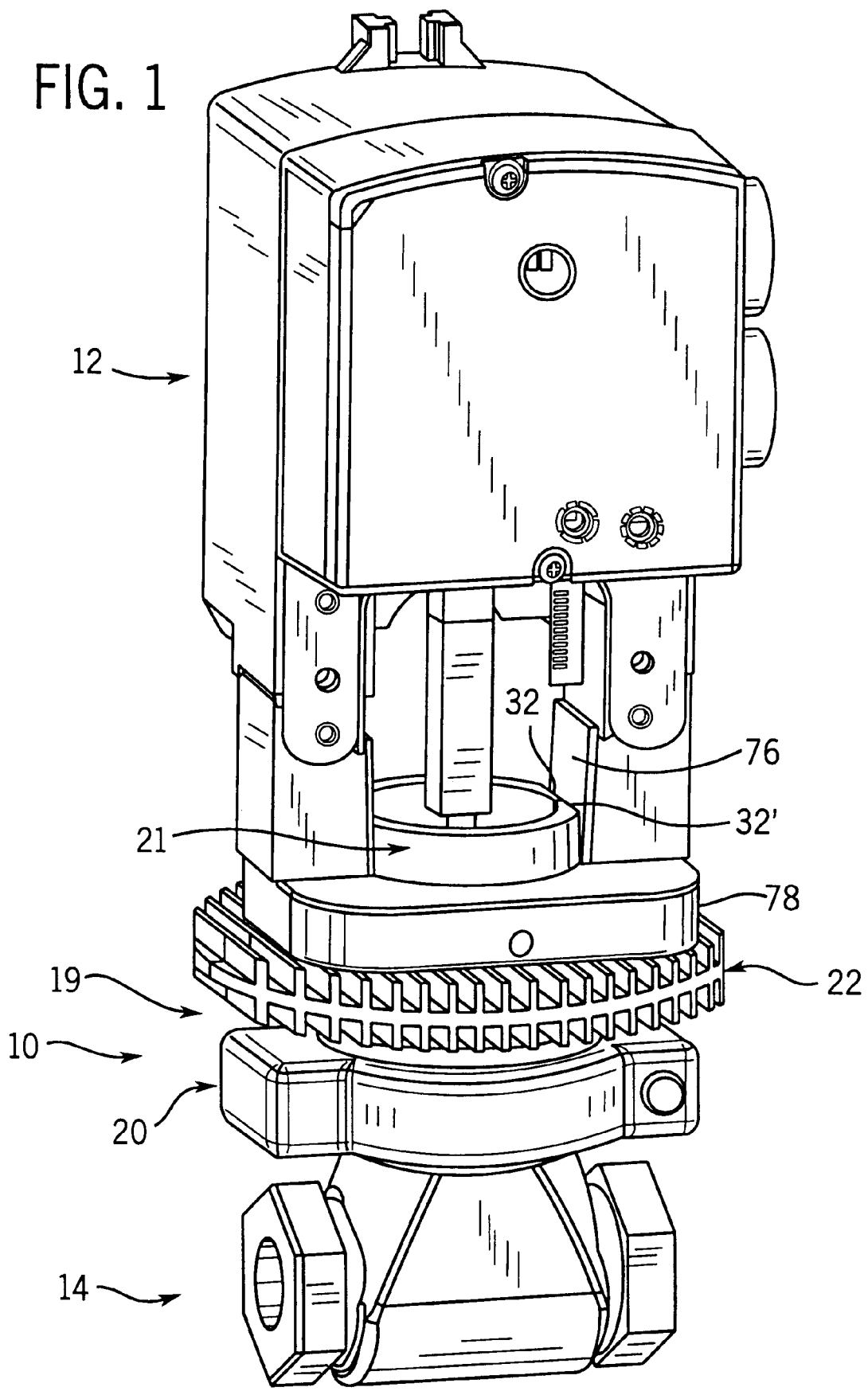
FIG. 1 is a perspective view of an actuator coupled to a valve and having an adapter according to the present invention disposed therebetween.

With reference to FIG. 1, an adapter 10 is disposed between and coupled to an actuator 12 and valve 14. In many situations, valves such as the valve 14 illustrated in FIG. 1 are used to convey hot fluids such as steam or hot water. The heat from the conveyed fluid generally increases the temperature of valve 14 whereupon heat is often transferred to actuator 12 such as by conduction or radiation. The presence of adapter 10 between actuator 12 and valve 14 eliminates or reduces heat transfer from valve 14 to actuator 12 both by conduction and radiation.

Figure 2:
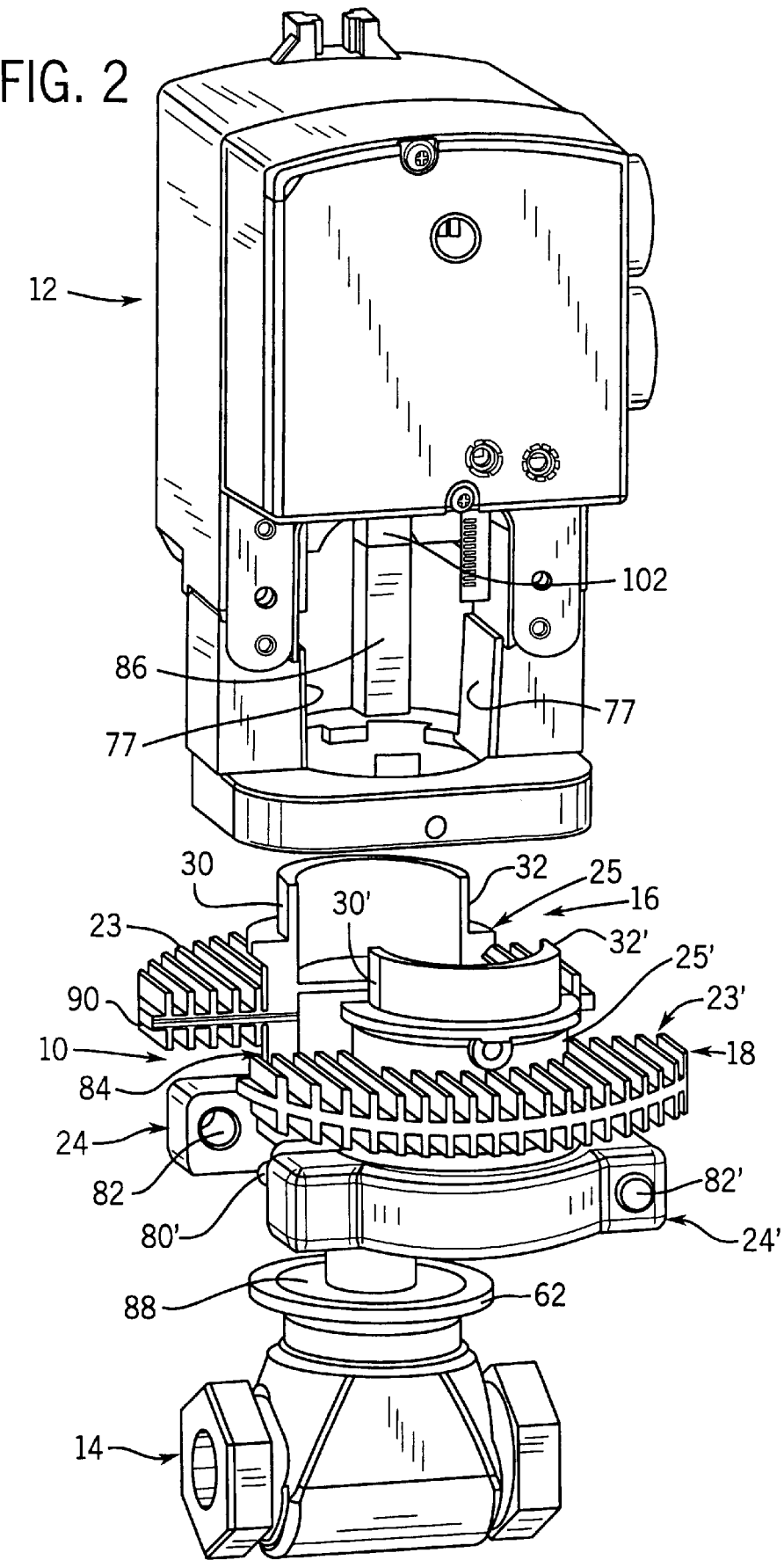
FIG. 2 is an exploded perspective view of the actuator, valve, and adapter illustrated in FIG. 1.

Adapter 10 includes a first member 16 and second member 18 that are substantially identical in configuration and engageable with one another (FIG. 2). First and second members 16 and 18, when assembled, cooperate to form an adapter body 19 including a flange 20 and an upstanding hub 21 (FIG. 1). A heat shield 22 extends radially from body 19 such as in the manner illustrated in FIG. 1 and described in detail hereinafter.

From the following description of the preferred embodiment of the present invention, those skilled in the art will appreciate that a particular benefit of the present invention is that adapter 10 attaches to the area on the valve that the actuator normally attaches so that no changes to the valve are required. Additionally, the area on the adapter to which the actuator is attached has substantially the same geometry as the area on the valve where the actuator normally attaches. As a result, no changes are required to the actuator in order to realize the benefits of adapter 10. Finally, adapter 10, when assembled and coupled to actuator 12 and valve 14, is held together without the use of fasteners. Specifically, first and second members 16 and 18 of adapter 10 are "clam-shelled" together around the valve in the manner hereinafter described and held together by the actuator. While no fasteners are necessary for this coupling arrangement, an area on adapter 10 is provided where a hose clamp can be attached to better secure the two members of the adapter to one another if necessary.

The components of first member 16 will now be described with reference to the figures. It will be appreciated that the components of second member 18 are substantially identical to those described for first member 16.

Figure 3:
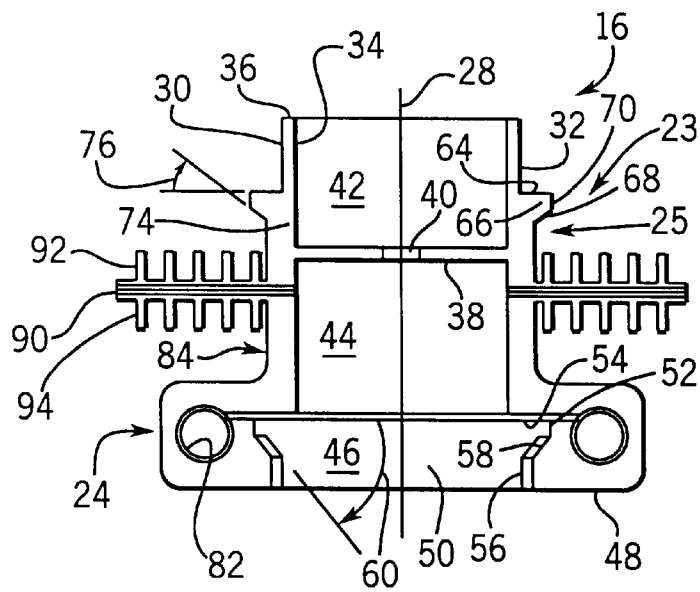
FIG. 3 is an elevational view of a first adapter member.

As is most clearly illustrated in FIG. 3, first member 16 includes body 23 including flange 24 and semi-cylindrical hub 25 integral with and extending upwardly from flange 24. It will be appreciated that, as shown in FIG. 2, second member 18 includes body 23' including flange 24' and semi-cylindrical hub 25' configured substantially identical to the corresponding components of first member 16 as hereinafter described. When first and second members 16 and 18 are operationally coupled to one another, flange portions 24 and 24' cooperate to define previously identified flange 20 and hub portions 25 and 25' cooperate to define upstanding hub 21 of adapter body 19.

Figure 5:
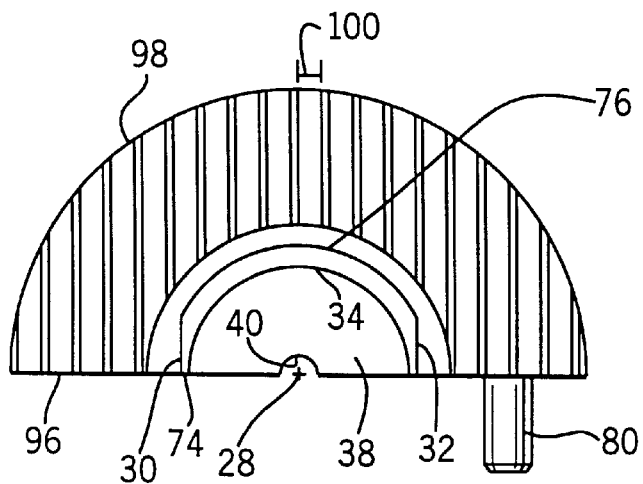
FIG. 5 is a top plan view of the first adapter member illustrated in FIG. 3.

With reference to first member 16, hub portion 25 defines an axis 28 and includes a pair of engagement surfaces 30 and 32 (FIG. 5) formed on the periphery thereof. Hub 25' of second member 18 includes similar engagement surfaces 30' and 32' (FIG. 2). Hub 25 also includes a substantially continuous inner surface 34 extending from an upper end face 36 into flange 24. Inner surface 34 is interrupted by a radially extending web or stop 38 that defines a semicircular recess 40 at axis 28 (FIG. 5). Inner surface 34 and stop 38 cooperate to define upper and lower cylindrical recesses 42 and 44, respectively, interconnected via recess 40 (FIG. 3). Those skilled in the art will appreciate that second member 18 includes a recess substantially identical to recess 40 of first member 16. When first and second members are engaged as illustrated in FIG. 1, these recesses cooperate to define a passage to accommodate valve stem 86 (FIG. 2).

Flange 24 includes a valve recess 46 extending axially toward hub 25 from a flange end face 48 and communicates with lower recess 44. Again, valve recess 46 is generally semi-cylindrical in cross section and defined by an inner surface 50. As illustrated in FIG. 3, inner surface 50 includes an inner axial face 52 extending from an inner annular face 54 toward end face 48. An outer axial face 56 extends inwardly from end face 48 terminating at an inclined face 58 that interconnects inner and outer axial faces 52 and 56. Face 58 is inclined relative to annular face 54 at an angle 60. In the preferred embodiment, angle 60 is approximately forty five degrees (45°) so as to cooperate with an appropriately configured flange 62 on valve 14 (FIG. 2). Those skilled in the art will appreciate that flange 62 is captured within the valve cavity defined by the valve recesses 46 in each of first and second adapter members 16 and 18 when the first and second members are operatively engaged in the manner shown in FIG. 1. Moreover, those skilled in the art will appreciate that angle 60 may be varied to accommodate a variety of valve flange configurations different from that illustrated in the drawings without departing from the scope of the invention as defined by the appended claims.

Returning to the description of the hub portion 25 of body 23, first and second peripheral planar surfaces 30 and 32 extend downwardly from upper end face 36 and terminate at an upper annular surface 64 of a capture ring 66. Capture ring 66 further includes an inclined surface 68 connected to upper surface 64 via radial planar surface 70. In the preferred embodiment, inclined face 68 is disposed at an angle of approximately 37.9 degrees relative to annular face 64 of capture ring 66. Those skilled in the art will appreciate that capture ring 66 of first and second adapter members 16 and 18 cooperate to define a circular ring configured similar to flange 62 of valve 14. By this arrangement, the area of adapter 10 proximate to capture ring 66 has the same or a similar geometry to the area on valve 14 proximate to flange 62 thereby allowing actuator 12 to be coupled to adapter 10 without modifying the connecting features of the actuator. Those skilled in the art will appreciate that the specific configuration of capture ring 66 may be modified to approximate the flange configurations of various valves without departing from the scope of the invention as defined by the appended claims.

As best illustrated in FIG. 5, first and second planar surfaces 30 and 32 on the periphery of hub 25 each extend from an engagement face 74 and are interconnected by a circular segment 76. As shown in FIGS. 1 and 2, the planar surfaces 30, 30', 32, and 32' of first and second adapter members 16 and 18 cooperate to engage plates 77 on actuator 12 to prevent rotational movement of the adapter relative to the actuator during operation.

As described above, first and second members 16 and 18 of adapter 10 are secured to one another by the retention of capture ring 66 within an appropriately configured recess defined by actuator base 78. As noted above, actuator base 78 is commonly provided with such a recess in order to accommodate valve flange 62. It is intended that capture ring 66 (FIG. 3) is securable within the actuator base recess without modification thereby facilitating coupling of adapter 10 to the actuator without the need for fasteners.

Figure 4:
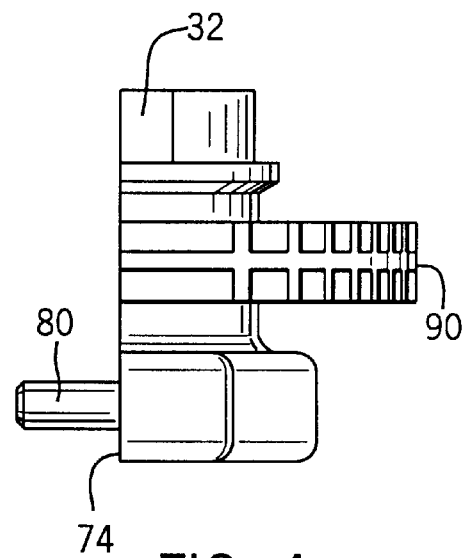
FIG. 4 is a right side elevational view of the first adapter member illustrated in FIG. 3.

To further facilitate a secure coupling of first and second members 16 and 18, flange 24 includes a generally cylindrical tab 80 extending perpendicularly from engagement face 74 (FIGS. 4 and 5). When first and second members 16 and 18 are assembled, tab 80 from the first member 16 is disposed within an appropriately configured opening 82' (FIG. 2) formed in second member 18. A similar tab 80' (FIG. 2) extending from second member 18 is disposable within an opening 82 formed in the flange 24 of first member 16. As best illustrated in FIG. 2, in the preferred embodiment of the present invention, opening 82 extends through flange 24 so as to align first and second members 16 and 18 relative to one another thereby facilitating assembly and to prevent the first and second members from tilting with respect to one another. To further facilitate securement of first and second members 16 and 18 to one another, an area 84 (FIG. 2) proximate to the interface of flange 24 and hub 25 is provided so that a hose clamp can be used to more securely couple first and second members to one another. Those skilled in the art will appreciate that the hose clamp may be necessary for some applications such as for large valves requiring high close-off forces.

The adapter described to this point reduces the heat transfer between valve 14 and actuator 12 by physically separating the actuator from the valve thus increasing the path that the heat must travel to reach the actuator. Heat transfer is further limited by the presence of stop 38. Specifically, the semicircular stops 38 of first and second members 16 and 18 cooperate to close around a valve stem 86 (FIG. 2) disposed within opening 40. As a result, the stops 38 prevent hot gas or liquid that escapes from the packing area 88 (FIG. 2) of the valve 14 from reaching the actuator.

In the preferred embodiment of the present invention as illustrated in the drawings, adapter 10 further includes heat shield 22 (FIG. 1) integral with and extending radially from hub 25 of body 23. Just as in the above/described components of adapter 10, first and second members 16 and 18 cooperate to define heat shield 22. Specifically, as illustrated in the drawings, first member 16 includes a semicircular plate 90 integral with hub 25 and having a plurality of upwardly and downwardly extending fins 92 and 94, respectively. Fins 92 and 94 are planar members extending to the circular periphery 98 of plate 90. In the illustrated embodiment, each of the upwardly extending fins 92 are parallel to one another and adjacent fins are separated by a uniform distance 100 (FIG. 5). A similar configuration is used for downwardly extending fins 94 as illustrated in FIG. 3.

Those skilled in the art will appreciate that heat shield 22 is coupled to the portion of the adapter which could conduct heat to the actuator. In operation, heat shield 22 dissipates heat from the adapter in this area thereby limiting heat transfer to the actuator. Additionally, heat shield 22 and, more particularly, plate 90 thereof serves as a shield to prevent any heat radiating from the valve from impacting actuator 12. Finally, fins 92 and 94 not only facilitate dissipation of heat from heat shield 22 but also serve as deflectors to channel hot air currents eminating from the valve away from the actuator.

In order to further limit the heat transfer between valve 14 and actuator 12, it is preferable that adapter 10 be formed of a material having a higher thermal resistance than metal. It is specifically contemplated that adapter 10 be formed of a plastic material such as Rhynite (Polyester PBT) or equivalents generally recognized in the art. It is further contemplated that adapter 10 may be constructed of similar materials known in the art through the use of recognized processes such as injection molding, stamping, or casting.

Finally, in order to accommodate the additional separation between actuator 12 and valve 14 provided by adapter 10, valve stem 86 is provided to couple the operational output of the actuator to the valve. It is contemplated that valve stem 86 may be a brass fitting which screws onto the actuator stem 102 (FIG. 2) in a manner known in the art or, in applications having sufficiently low close-off forces, the fitting may be formed of plastic in order to further limit heat transfer.

Various other advantages of the present invention will become apparent to those skilled in the art after having the benefit of studying the foregoing text and the appended drawings, taken in conjunction with the following claims.

What is claimed is:

1. An adapter for intercoupling a valve and an actuator, said adapter comprising:
   a body for separating the actuator from the valve, said body including a flange for coupling said adapter to the valve, an upstanding hub for coupling said adapter to the actuator, a heat shield between the flange and the upstanding hub, and a passage extending through said body to accommodate a stem for operationally coupling the actuator to the valve.

2. The adapter of claim 1 wherein said body includes a first member and a second member engaging the first member, said first and second members each defining a portion of the flange, the upstanding hub and the heat shield.

3. The adapter of claim 2 wherein each of the first and second members is generally semi-cylindrical in cross section.

4. The adapter of claim 1 wherein the flange includes an interior recess for receiving an element of the valve.

5. The adapter of claim 1 wherein heat shield has a plurality of fins projecting outward there from.

6. An adapter for coupling a valve to an actuator, said adapter disposable between the actuator and the valve to reduce heat transfer therebetween, said adapter comprising:
   a first member; and
   a second member, said first and second members each including a flange and a hub extending from said flange, said first and second members being engageable such that said flanges define first means for coupling said adapter to the valve and said hubs define second means for coupling said adapter to the actuator.

7. The adapter of claim 6 wherein each of said hubs define an axis, said hubs being generally semi-cylindrical in cross section relative to said axis and defining an inner surface and an outer surface, said outer surface of said hubs defining said second means.

8. The adapter of claim 7 wherein said hubs each include a stop extending radially inward toward said axis from said inner surfaces, said stop defining a passage to accommodate a stem for operationally coupling the actuator to the valve when said first and second members are engaged.

9. The adapter of claim 7 wherein said first and second members define a heat shield.

10. The adapter of claim 9 wherein each of said first and second members include a plate extending radially from said hub and fins coupled to said plate, said hub and fins of said first and second member defining said heat shield.

11. An adapter for coupling a valve to an actuator, said adapter disposable between the actuator and the valve to reduce heat transfer therebetween, said adapter comprising:
    a first member having a first flange and a second flange; and
    a second member engaging the first member, and having a third flange and a fourth flange;
    wherein the first and third flanges define a first means for coupling said adapter to the valve, and the second and fourth flanges define second means for coupling said adapter to the actuator.

12. The adapter of claim 11 wherein each of the second and fourth flanges have a hub which also defines the second means for coupling said adapter to the actuator.

13. The adapter of claim 12 wherein each of said hubs define an axis, said hubs being generally semi-cylindrical in cross section relative to said axis and defining an inner surface and an outer surface, said outer surface of said hubs defining said second means.

14. The adapter of claim 11 wherein each of said first and second members further comprises a plurality of fins for dissipating heat.

15. The adapter of claim 11 wherein the first and third flanges each have an interior recess for receiving an element of the valve.

* * * * *